United States Patent [19]
Sato et al.

[11] Patent Number: 6,063,488
[45] Date of Patent: May 16, 2000

[54] HYDROPHILIC ACRYLIC COPOLYMERS, HYDROPHILIC ACRYLIC RESIN PARTICLES AND INK-JET RECORDING MEDIA

[75] Inventors: Masahiro Sato; Masayuki Yamagishi, both of Sayama, Japan

[73] Assignee: Soken Chemical & Engineering Co., Ltd., Japan

[21] Appl. No.: 09/124,616

[22] Filed: Jul. 29, 1998

[51] Int. Cl.[7] .......................... B41M 5/00; C08F 210/00; C08F 236/00

[52] U.S. Cl. .................. 428/327; 428/206; 428/402; 428/500; 428/913; 347/105; 526/307.7; 526/312; 526/292.2; 526/930

[58] Field of Search ..................... 428/206, 323, 428/327, 402, 500, 511, 514, 522, 913; 526/292.2, 292.6, 303.1, 930, 292.4, 307.5, 307.7, 310, 312; 162/168.2, 168.3; 347/105

[56] References Cited

U.S. PATENT DOCUMENTS

| | | | |
|---|---|---|---|
| 4,503,111 | 3/1985 | Jaeger et al. | 428/195 |
| 4,668,747 | 5/1987 | Cadel et al. | 526/216 |
| 4,783,513 | 11/1988 | Cadel et al. | 526/216 |
| 4,887,097 | 12/1989 | Akiya et al. | 346/135.1 |
| 5,262,238 | 11/1993 | Trouve et al. | 428/402 |
| 5,439,739 | 8/1995 | Furukawa et al. | 428/341 |
| 5,681,643 | 10/1997 | Noguchi et al. | 428/195 |
| 6,001,466 | 12/1999 | Noguchi et al. | 428/327 |

FOREIGN PATENT DOCUMENTS

| | | |
|---|---|---|
| 59-174381 | 10/1984 | Japan . |
| 60-132785 | 7/1985 | Japan . |
| 60-145879 | 8/1985 | Japan . |
| 60-224578 | 11/1985 | Japan . |
| 61-032788 | 2/1986 | Japan . |
| 61-123616 | 6/1986 | Japan . |
| 8-058226 | 3/1996 | Japan . |
| 8-169176 | 7/1996 | Japan . |
| 8-174994 | 7/1996 | Japan . |

*Primary Examiner*—Marie Yamnitzky
*Attorney, Agent, or Firm*—Webb Ziesenheim Logsdon Orkin & Hanson, P.C.

[57] ABSTRACT

The acrylic copolymer and the acrylic resin particles of the invention have a recurring unit derived from a nitrogen-containing acrylic monomer having, in its molecule, at least one $CH_2=CR^1-CO-$ group ($R^1$ is a hydrogen atom, methyl or ethyl) and at least one $-N^+R^2_3.X^-$ group ($R^2$ is $H-$, an alkyl group of 1 to 5 carbon atoms or an alkylol group of 1 to 5 carbon atoms, and X is a halogen atom) and a recurring unit derived from an acrylic monomer represented by the formula $CH_2=CR^3-CO-Q$ wherein $R^3$ is $H-$, $CH_3-$ or $C_2H_5-$, and Q is $-NH_2$, $-NH-R^4-OH$ ($R^4$ is an alkylene group of 1 to 5 carbon atoms) or $-R^5$ ($R^5$ is $H-$ or an alkoxy group of 1 to 20 carbon atoms), and further have a crosslinked structure. The ink-jet recording medium of the invention contains the acrylic resin particles in its ink-receiving layer. The acrylic resin particles have good water resistance though they are hydrophilic. Therefore, the resin particles are favorable as those introduced into an ink-receiving layer of an ink-jet recording medium.

3 Claims, 4 Drawing Sheets

HYDROPHILIC ACRYLIC COPOLYMERS, HYDROPHILIC ACRYLIC RESIN PARTICLES AND INK-JET RECORDING MEDIA

FIELD OF THE INVENTION

The present invention relates to acrylic copolymers having good hydrophilic properties, hydrophilic acrylic resin particles and ink-jet recording media using the hydrophilic resin particles.

BACKGROUND OF THE INVENTION

With rapid spreading of word processors or personal computers, various recording systems have been adopted. As one of the recording systems, an ink-jet recording system is known.

The ink-jet recording system is a recording system wherein ink droplets are jetted onto a surface of a recording medium and attached thereon. Therefore, the surface of the recording medium needs to rapidly absorb the jetted ink droplets. The recording media for use in the ink-jet recording system are not limited to paper but include various materials such as transparent resin films for OHP and metals. Some of these recording media have no hydrophilic surfaces. Therefore, in order to clearly record information, an ink-receiving layer needs to be provided on a surface of a substrate constituting the recording medium.

On that account, there have been made a great number of proposals for forming an ink-receiving layer (recording layer) containing hydrophilic resins, such as starch, water-soluble cellulose derivative, polyvinyl alcohol, modified polyvinyl alcohol, polyvinyl pyrrolidone and polyvinyl acetal, on the substrate surface (see: Japanese Patent Laid-Open Publications No. 174381/1984, No. 132785/1985, No. 145879/1985, No. 224578/1985, No. 32788/1986, No. 169176/1996 and No. 174994/1996).

The ink-jet recording media are required to have the following characteristics: (1) permeation of ink inside the ink-receiving layer must be rapidly made, color running should not take place, and clear color having high chromaticity can be reproduced; (2) in the multi-color recording using a combination of ink components, each ink component must be rapidly absorbed even if ink dots are superposed on the same surface of the recording medium, and in the high-speed recording, the recorded surface must be free from staining, and the ink absorption rate and the ink absorption quantity must be both satisfactory; (3) the recording medium must have water resistance, and even if the recorded image is contacted by water, running or bleeding of ink of the image must not take place; (4) even if the ink-jet recording media are stored in the superposed state, they must be free from blocking; and (5) even if the printed matter is stored for a long period of time, color fading or the like should not take place.

In the ink-jet recording media disclosed in the above publications, however, there is almost no medium satisfying all of the above-mentioned characteristics required for ink-jet recording media.

For example, the hydrophilic resins used in the ink-receiving layer have problems in that they do not have sufficient water resistance because they have a polar group to ensure the hydrophilic properties and that the color of the ink attached to the ink-receiving layer sometimes changes because of the polar group introduced to ensure the hydrophilic properties.

It is an object of the invention to provide a novel acrylic copolymer, acrylic resin particles and uses thereof.

More particularly, the object of the invention is to provide a novel acrylic copolymer containing recurring units derived from a specific monomer having an ethylenic double bond and a polar group, acrylic resin particles obtained by shaping the acrylic copolymer into particles, and an ink-jet recording medium of good image-forming properties using the acrylic resin particles.

SUMMARY OF THE INVENTION

The hydrophilic acrylic copolymer according to the present invention is a copolymer having a crosslinked structure, and comprising:

a recurring unit derived from a nitrogen-containing acrylic monomer having, in its molecule, at least one $CH_2=CR^1-CO-$ group ($R^1$ is a hydrogen atom, methyl or ethyl) and at least one $-N^+R^2{}_3.X^-$ group (each $R^2$ is independently a hydrogen atom, an alkyl group of 1 to 5 carbon atoms or an alkylol group of 1 to 5 carbon atoms, and X is a halogen atom), and a recurring unit derived from an acrylic monomer represented by the following formula [A]:

$$CH_2=CR^3-CO-Q \qquad [A]$$

wherein $R^3$ is a hydrogen atom, methyl or ethyl, and Q is $-NH_2$, $-NH-R^4-OH$ ($R^4$ is an alkylene group of 1 to 5 carbon atoms) or $-R^5$ ($R^5$ is a hydrogen atom or an alkoxy group of 1 to 20 carbon atoms).

The hydrophilic acrylic resin particles according to the present invention are particles comprising a hydrophilic acrylic copolymer having a crosslinked structure, and comprising:

a recurring unit derived from a nitrogen-containing acrylic monomer having, in its molecule, at least one $CH_2=CR^1-CO-$ group ($R^1$ is a hydrogen atom, methyl or ethyl) and at least one $-N^+R^2{}_3.X^-$ group (each $R^2$ is independently a hydrogen atom, an alkyl group of 1 to 5 carbon atoms or an alkylol group of 1 to 5 carbon atoms, and X is a halogen atom), and a recurring unit derived from an acrylic monomer represented by the following formula [A]:

$$CH_2=CR^3-CO-Q \qquad [A]$$

wherein $R^3$ is a hydrogen atom, methyl or ethyl, and Q is $-NH_2$, $-NH-R^4-OH$ ($R^4$ is an alkylene group of 1 to 5 carbon atoms) or $-R^5$ ($R^5$ is a hydrogen atom or an alkoxy group of 1 to 20 carbon atoms).

The ink-jet recording medium according to the present invention is a recording medium comprising a substrate and an ink-receiving layer formed on a surface of the substrate, wherein the ink-receiving layer contains hydrophilic acrylic resin particles comprising a hydrophilic acrylic copolymer having a crosslinked structure, and comprising:

a recurring unit derived from a nitrogen-containing acrylic monomer having, in its molecule, at least one $CH_2=CR^1-CO-$ group ($R^1$ is a hydrogen atom, methyl or ethyl) and at least one $-N^+R^2{}_3.X^-$ group (each $R^2$ is independently a hydrogen atom, an alkyl group of 1 to 5 carbon atoms or an alkylol group of 1 to 5 carbon atoms, and X is a halogen atom), and a recurring unit derived from an acrylic monomer represented by the following formula [A]:

$$CH_2=CR^3-CO-Q \qquad [A]$$

wherein $R^3$ is a hydrogen atom, methyl or ethyl, and Q is $-NH_2$, $-NH-R^4-OH$ ($R^4$ is an alkylene group of 1 to 5 carbon atoms) or $-R^5$ ($R^5$ is a hydrogen atom or an alkoxy group of 1 to 20 carbon atoms).

The hydrophilic acrylic copolymer and the hydrophilic acrylic resin particles according to the invention exhibit excellent hydrophilic properties and water resistance, because they have a crosslinked structure and have a $-N^+R^2{}_3.X^-$ group.

The ink-jet recording medium according to the invention exhibits excellent ink absorption and ink fixation, because it contains the hydrophilic acrylic resin particles in the ink-receiving layer. Besides, the ink-jet recording medium shows good blocking resistance.

DETAILED DESCRIPTION OF THE INVENTION

The acrylic copolymer, the acrylic resin particles and the ink-jet recording medium containing the acrylic resin particles according to the invention are described in detail hereinafter.

The acrylic copolymer of the invention has at least two different recurring units.

One of the recurring units is a recurring unit derived from a nitrogen-containing acrylic monomer having at least one $CH_2=CR^1-CO-$ group and at least one $-N^+R^2{}_3.X^-$ group in the molecule.

In the $CH_2=CR^1-CO-$ group constituting the nitrogen-containing acrylic monomer, $R^1$ is a hydrogen atom, methyl or ethyl.

In the $-N^+R^2{}_3.X^-$ group, each $R^2$ is independently a hydrogen atom, an alkyl group of 1 to 5 carbon atoms or an alkylol group of 1 to 5 carbon atoms (i.e., HO—R— wherein R is an alkylene group of 1 to 5 carbon atoms), and X is a halogen atom (preferably chlorine).

The number of the $CH_2=CR^1-CO-$ groups in the nitrogen-containing acrylic monomer is preferably one or two, and the number of the $-N^+R^2{}_3.X^-$ groups in the monomer is preferably one or two. Therefore, available as the nitrogen-containing acrylic monomer for use in the preparation of the copolymer of the invention are:

(1) a nitrogen-containing acrylic monomer wherein the number of the $CH_2=CR^1-CO-$ groups is two and the number of the $-N^+R^2{}_3.X^-$ groups is two, (2) a nitrogen-containing acrylic monomer wherein the number of the $CH_2=CR^1-CO-$ groups is two and the number of the $-N^+R^2{}_3.X^-$ groups is one, (3) a nitrogen-containing acrylic monomer wherein the number of the $CH_2=CR^1-CO-$ groups is one and the number of the $-N^+R^2{}_3.X^-$ groups is two, and (4) a nitrogen-containing acrylic monomer wherein the number of the $CH_2=CR^1-CO-$ groups is one and the number of the $-N^+R^2{}_3.X^-$ groups is one.

In the present invention, particularly preferable are the nitrogen-containing acrylic monomers (1), (2) and (3).

The $CH_2=CR^1-CO-$ group and the $-N^+R^2{}_3.X^-$ group are generally bonded by constituent units derived from single or plural alkylene glycols. Likewise, the $CH_2=CR^1-CO-$ group and the $CH_2=CR^1-CO-$ group are generally bonded by constituent units derived from single or plural alkylene glycols. Examples of preferred alkylene glycols include ethylene glycol and propylene glycol.

The nitrogen-containing acrylic monomer having two $CH_2=CR^1-CO-$ groups and two $-N^+R^2{}_3.X^-$ groups is, for example, the following compound [I].

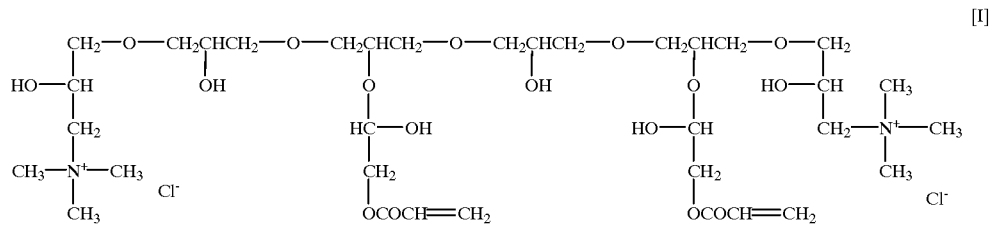

The compound (monomer) [I] can be prepared by causing 1 mol of a compound having an epoxy group and represented by the following formula [I-1] to react with 2 mol of acrylic acid and 2 mol of trimethylamine hydrochloride.

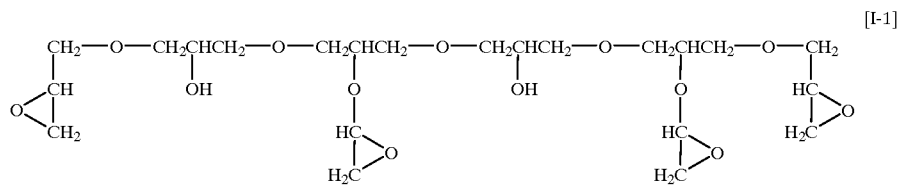

Figure 1:
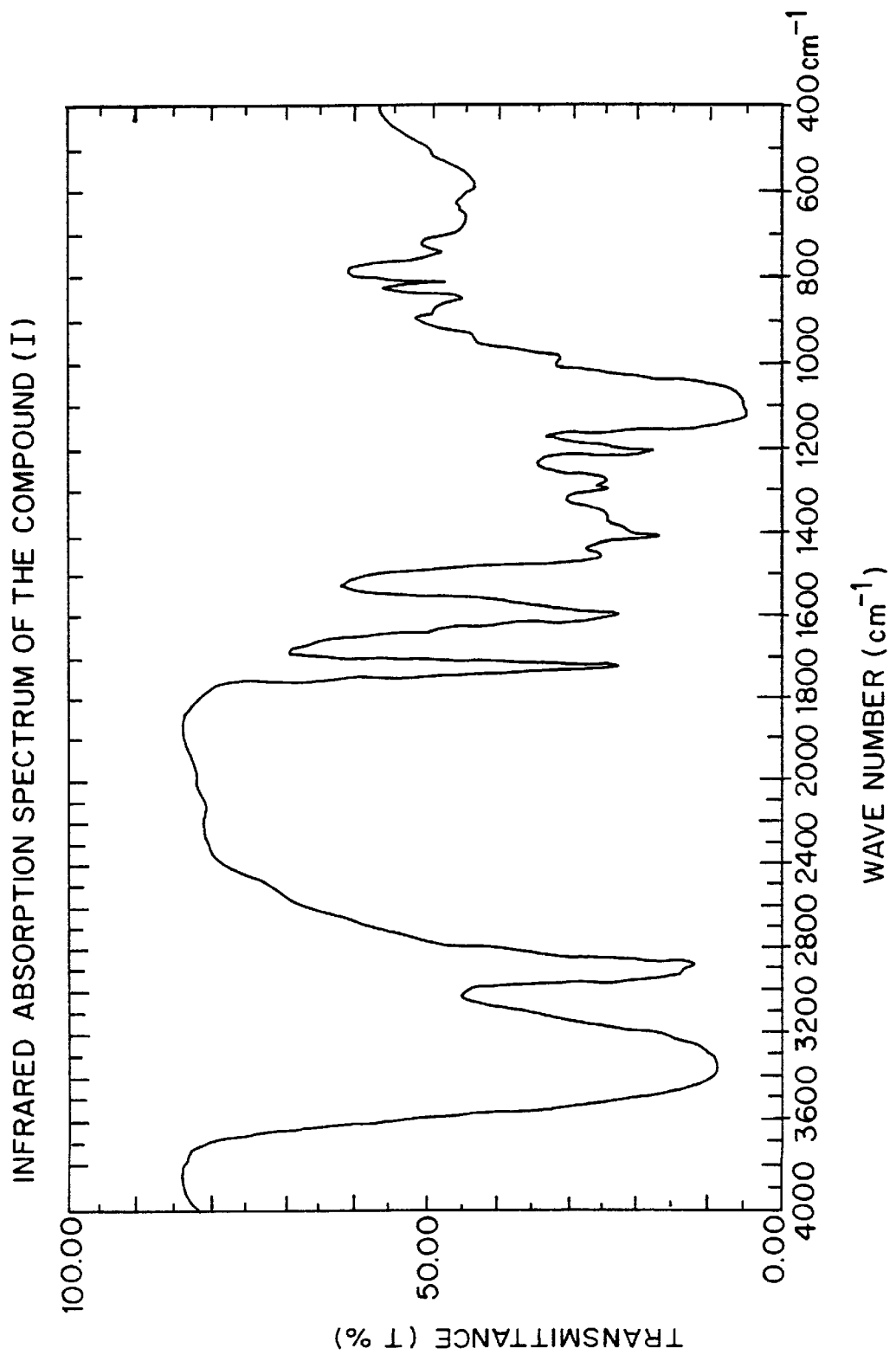
FIG. 1 is a chart of an infrared absorption spectrum of a compound represented by the formula [I], said spectrum being measured by a tablet method.

The compound represented by the formula [I] has a molecular weight of 845. An infrared absorption spectrum of this compound is shown in FIG. 1.

The nitrogen-containing acrylic monomer having two $CH_2=CR^1$—CO— groups and one —$N^+R^2_3.X^-$ group is, for example, the following compound [II].

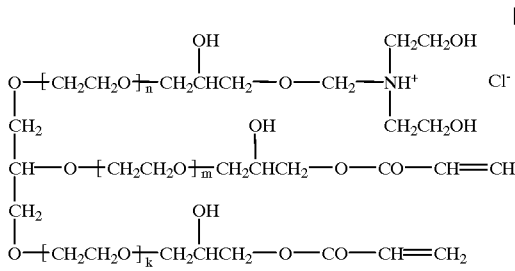

[II]

wherein n, m and k are each an integer of 1 or greater, and the sum of n, m and k is 10 to 20, preferably 14 to 16, most preferably 15.

The nitrogen-containing acrylic monomer having one $CH_2=CR^1$—CO— group and one —$N^+R^2_3.X^-$ group is, for example, the following compound [III] or [III-1].

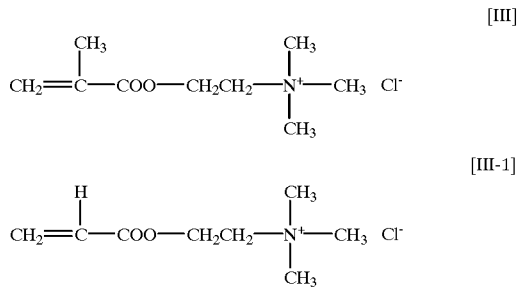

[III]

[III-1]

The other recurring unit which constitute the acrylic copolymer of the invention together with the recurring unit derived from the above-mentioned nitrogen-containing acrylic monomer is a recurring unit derived from an acrylic monomer represented by the following formula [A].

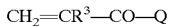   [A]

In the formula [A], $R^3$ is a hydrogen atom, methyl or ethyl.

Specifically, there can be mentioned the following compounds.

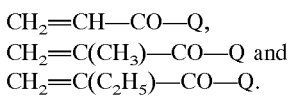

In the formula [A], Q is —$NH_2$, —NH—$R^4$—OH ($R^4$ is an alkylene group of 1 to 5 carbon atoms) or —$R^5$ ($R^5$ is a hydrogen atom or an alkoxy group of 1 to 20 carbon atoms).

The compound represented by the formula [A] wherein Q is the —$NH_2$ group is acrylamide, methacrylamide or ethacrylamide.

The compound represented by the formula [A] wherein Q is the NH—$R^4$—OH group is alkylol aminoacrylate or alkylol aminomethacrylate.

The compound represented by the formula [A] wherein Q is the —$R^5$ group is alkyl acrylate, alkyl methacrylate or alkyl ethacrylate.

Examples of the compounds represented by the formula [A] include:

acrylamide, methacrylamide and ethacrylamide;

methylol aminoacrylate, methylol aminomethacrylate, ethylol aminoacrylate and ethylol aminomethacylate; and methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, nonyl (meth)acrylate, decyl (meth)acrylate, undecyl (meth)acrylate and dodecyl (meth)acrylate.

The acrylic copolymer of the invention is a bipolymer or higher polymer of the nitrogen-containing acrylic monomer represented by, for example, the formula [I], [II] or [III] and the acrylic monomer represented by the formula [A]. The copolymer may have recurring units derived from other monomers than the nitrogen-containing acrylic monomer and the acrylic monomer represented by the formula [A].

In the acrylic copolymer of the invention, other monomers may be copolymerized in amounts not detrimental to the properties of the copolymer. Examples of such monomers include (meth)acrylic acid; (meth)acrylic esters, such as glycidyl (meth)acrylate, methoxymethyl (meth)acrylate, propoxyethyl (meth)acrylate, butoxyethyl (meth)acrylate, methoxydiethylene glycol (meth)acrylate, butoxytriethylene glycol (meth)acrylate, methoxydipropylene glycol (meth) acrylate, phenoxyethyl (meth)acrylate, phenoxydiethylene glycol (meth)acrylate, phenoxytetraethylene glycol (meth) acrylate, benzyl (meth)acrylate, cyclohexyl (meth)acrylate, tetrahydrofurfuryl (meth)acrylate, dicyclopentenyl (meth) acrylate, dicyclopentenyloxyethyl (meth)acrylate, (meth) acrylonitrile, 2-hydroxyethyl (meth)acrylate, hydroxypropyl (meth)acrylate and hydroxybutyl (meth)acrylate; and vinyl monomers having one vinyl group in one molecule, such as styrene, methylstyrene, vinylpyridine and vinyl acetate.

In the acrylic copolymer of the invention, the nitrogen-containing acrylic monomer is copolymerized in an amount of usually 5 to 100 parts by weight, preferably 15 to 60 parts by weight, the acrylic monomer represented by the formula [A] is copolymerized in an amount of 0 to 95 parts by weight, preferably 40 to 85 parts by weight, and the other monomer is copolymerized in an amount of usually 0 to 50 parts by weight, preferably 0 to 25 parts by weight, each amount being in terms of charge weight based on 100 parts by weight of the copolymer.

The acrylic copolymer of the invention has a recurring unit derived from the nitrogen-containing acrylic monomer and a recurring unit derived from the acrylic monomer represented by the formula [A], and further has a crosslinked structure.

The nitrogen-containing acrylic monomer having two or more $CH_2=CR^1$—CO— groups in the molecule has self crosslinkability, and each of the two or more $CH_2=CR^1$—CO— groups forms a polymer of different chain structure. Therefore, the nitrogen-containing acrylic monomer per se functions as a crosslinking agent to form a crosslinked structure. Further, the —$N^+R^2_3.X^-$ group of the nitrogen-containing acrylic monomer has reactivity to other reactive groups or other crosslinking agents. Therefore, a crosslinked structure can be also formed by virtue of the —$N^+R^2_3.X^-$ group or based on the —$N^+R^2_3.X^-$ group.

Some of the compounds represented by the formula [A] have self crosslinkability. For example, compounds having an alkylol group such as methylol from among the compounds of the formula [A] can form a structure, such as —NH—$CH_2$—O—$CH_2$—NH— by dehydration reaction, and owing to such divalent structure, a crosslinked structure can be formed between the molecules.

In the present invention, the crosslinked structure can be formed by not only utilizing the used monomers as mentioned above but also using a crosslinking agent or an organic peroxide separately from the above monomers. As the crosslinking agent, a polyfunctional monomer, a polyisocyanate crosslinking agent, an epoxy crosslinking agent, a metallic salt chelate crosslinking agent or a melamine crosslinking agent can be employed.

Particular examples of the crosslinking agents include polyfunctional monomers, such as divinylbenzene, ethylene glycol (meth)acrylate, triethylene glycol di(meth)acrylate, trimethylolpropane tri(meth)acrylate, pentaerythritol tri(meth)acrylate, 1,1,1-trishydroxymethylethane diacrylate and 1,1,1-trishydroxymethylpropane triacrylate; tolylene diisocyanate methylolpropane adduct (trade name: Colonate L); and N,N,N',N'-tetraglycidyl-m-xylenediamine (trade name: Tetrade X). An example of the peroxide employable for forming a crosslinked structure is benzoyl peroxide.

When the crosslinking agent or the peroxide is used, the amount of the crosslinking agent or the peroxide is in the range of usually 0.1 to 20 parts by weight, preferably 1 to 10 parts by weight, based on 100 parts by weight of the monomers.

In the acrylic copolymer having the crosslinked structure according to the invention, for example, the following recurring units are formed.

In the copolymer of the compound represented by the formula [III], for example, acrylamide and N-methylolacrylamide, these monomers form the following recurring units.

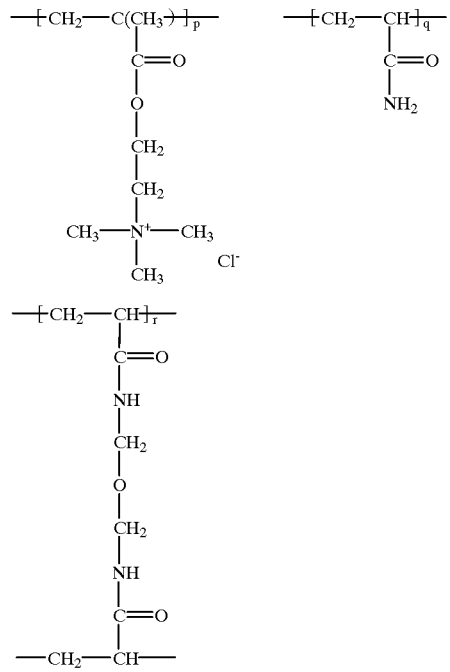

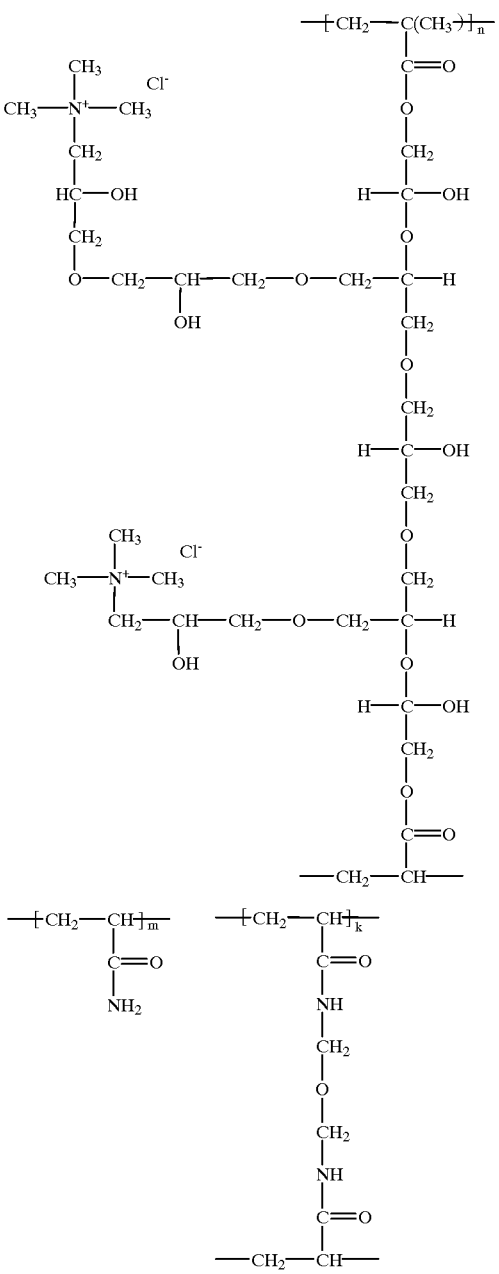

In the copolymer, the above recurring units are bonded at random, and each of p, q and r represents a relative ratio of each recurring unit. It is preferred that when p is 1, q is in the range of usually 0.01 to 100, preferably 0.1 to 10, and r is in the range of usually 0.01 to 100, preferably 0.1 to 10. The recurring unit derived from N-methylolacrylamide, that is described on the right side, exhibits a crosslinked structure formed by dehydration.

In the copolymer of the compound represented by the formula [I], acrylamide and N-methylolacrylamide, these monomers form the following recurring units.

Figure 4:
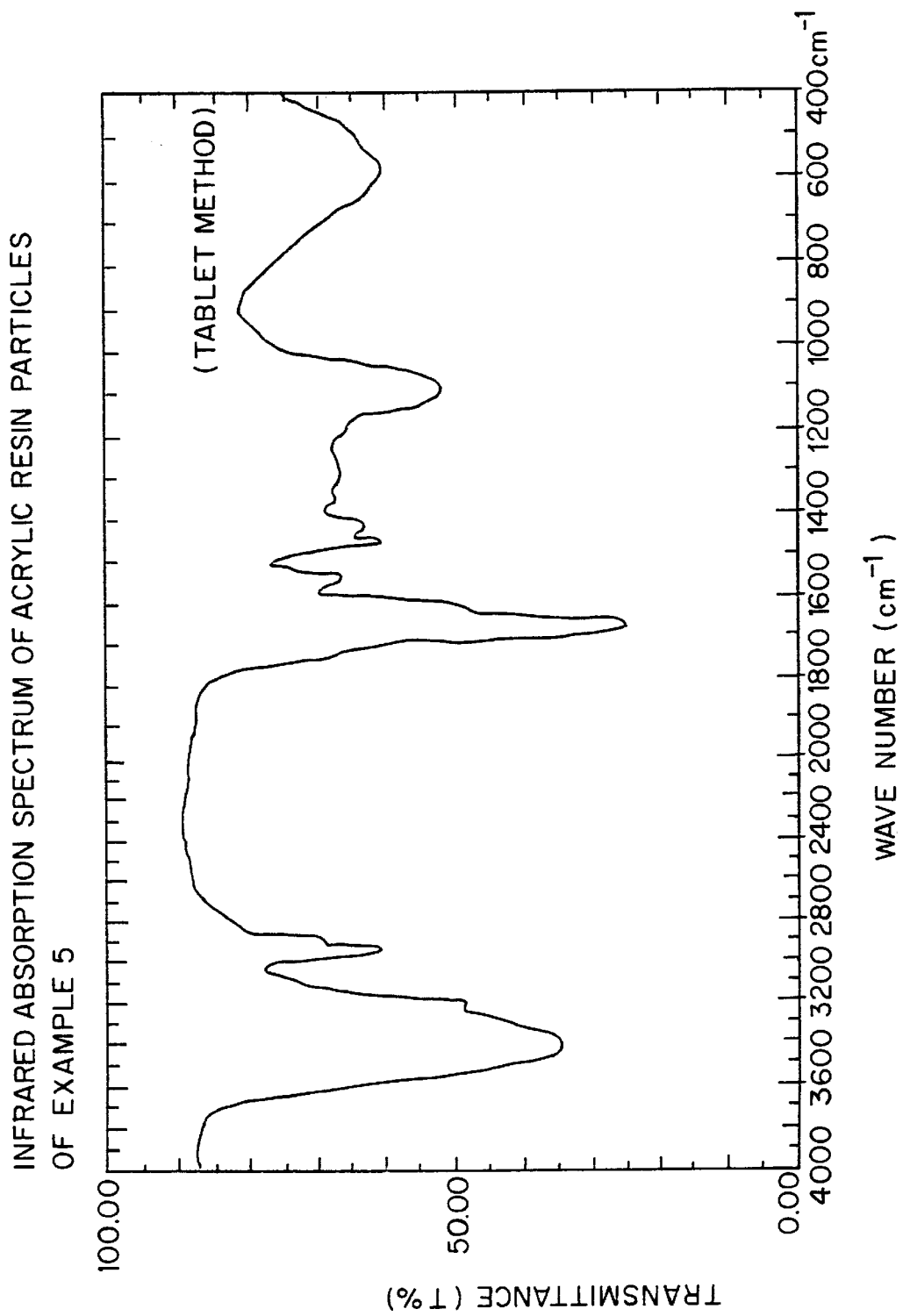
FIG. 4 is a chart of an infrared absorption spectrum of acrylic resin particles prepared in Example 5, said spectrum being measured by a tablet method.

In the copolymer, the above recurring units are bonded at random, and each of n, m and k represents a relative ratio of each recurring unit. It is preferred that when n is 1, m is in the range of usually 0.01 to 100, preferably 0.1 to 10, and k is in the range of usually 0.01 to 100, preferably 0.1 to 10. The recurring unit derived from N-methylolacrylamide, that is described on the right side, exhibits a crosslinked structure formed by dehydration. The recurring unit derived from the compound of the formula [I], that is described on the left side, also exhibits a crosslinked structure. An infrared absorption spectrum of the acrylic copolymer comprising the above recurring units is shown in FIG. 4.

Because the acrylic copolymer of the invention has the $-N^+R^2{}_3 \cdot X^-$ group ($R^2$ and X have the same meanings as defined above) and further has a polar group such as $-NH_2$ or $-NH-R^4-OH$ ($R^4$ has the same meaning as defined above) as described above, it shows excellent hydrophilic properties. Therefore, if the acrylic copolymer is compounded into an ink-receiving layer of an ink-jet recording medium, the ink-receiving layer exhibits good ink absorption. Further, because the crosslinked structure is formed in the acrylic copolymer as described above, the ink-receiving layer containing the copolymer is free from occurrence of tack. Moreover, the ink-receiving layer shows good water resistance though it is hydrophilic, and even if the printed matter is stored for a long period of time, color fading or the like does not take place.

The acrylic copolymer of the invention can be prepared by various processes such as processes of bulk polymerization, solution polymerization, dispersion polymerization and emulsion polymerization.

The acrylic copolymer of the invention can be prepared by, for example, the following process.

In the first place, the nitrogen-containing acrylic monomer, the acrylic monomer represented by the formula [A] and an emulsifying agent are added to an aqueous medium to disperse the monomer components in the aqueous medium. Examples of the aqueous media employable herein include water and a water/alcohol mixed solvent. The air in the reactor containing the resulting dispersion is preferably replaced with an inert gas such as a nitrogen gas. After the replacement with the inert gas, the dispersion is heated to a temperature of usually 60 to 80° C.

Separately, a polymerization initiator is dissolved in an aqueous medium to prepare a solution of the polymerization initiator.

The solution of the polymerization initiator is dropwise added slowly to the dispersion to polymerize the monomer components. After the dropwise addition of the solution of the polymerization initiator, the temperature of the reaction liquid is preferably elevated to 80 to 90° C. At this temperature, the copolymerization reaction is conducted for usually 60 to 300 minutes, preferably 120 to 240 minutes.

After the copolymerization, the reaction product is separated from the aqueous medium by filtration or the like to obtain the acrylic copolymer of the invention.

The acrylic copolymer of the invention can be prepared also by the following process.

An organic solvent such as toluene is introduced into a reactor. A polymerization initiator is added to the organic solvent, and they are stirred to dissolve the polymerization initiator in the organic solvent.

Separately, to a lower alcohol such as isopropyl alcohol, the nitrogen-containing acrylic monomer and the acrylic monomer represented by the formula [A] are added, and an emulsifying agent is further added, to dissolve the monomer components in the lower alcohol.

Then, the lower alcohol solution of the monomer components and the emulsifying agent is added to the toluene solution of the polymerization initiator with stirring. At this time, the air in the reactor has been preferably replaced with an inert gas such as a nitrogen gas.

The reaction liquid is preset at a temperature of usually 60 to 80° C., preferably 65 to 75° C. Under such temperature conditions, the reaction time is in the range of usually 180 to 240 minutes.

After the reaction is completed, the resulting acrylic copolymer is separated from the reaction solvent by filtration or the like. The thus obtained acrylic copolymer can be washed with toluene, if necessary. After the acrylic copolymer is dried, it is ground by a grinding means such as a jet grinder, whereby particulate acrylic copolymer can be obtained. The mean particle diameter of the obtained particles is in the range of usually 0.05 to 100 $\mu$m, preferably 0.1 to 70 $\mu$m.

In the preparation of the acrylic copolymer of the invention by such the above processes, an emulsifying agent is used. Though any of a cationic emulsifying agent, a nonionic emulsifying agent and an anionic emulsifying agent can be used as the emulsifying agent, particularly preferably used is a nonionic emulsifying agent having HLB of not more than 10. Examples of the nonionic emulsifying agents preferably used include polyoxyalkylene alkylphenyl ether, phosphoric ester of polyoxyalkylene alkyl ether, phosphoric ester of polyoxyalkylene alkylallyl ether, polyoxyalkylene ester, polyoxyalkylene alkylamine, and polyoxyalkylene sorbitan ester. Of these, particularly preferable is phosphoric ester of polyoxyethylene alkyl ether wherein the number of carbon atoms of the alkyl chain is 7 to 11. By the use of the phosphoric ester of polyoxyethylene alkyl ether, the polymerization system can be stabilized, and thereby fine particles having a mean particle diameter of, for example, not more than 1 $\mu$m can be prepared.

The emulsifying agent is used in an amount of usually 1 to 40 parts by weight, preferably 5 to 30 parts by weight, based on 100 parts by weight of the monomer components.

In the above reaction, a polymerization initiator is used. There is no specific limitation on the polymerization initiator used herein, and those of various types such as an inorganic polymerization initiator, an organic polymerization initiator and an azo polymerization initiator can be used. Particular examples of the polymerization initiators employable in the invention include benzoyl peroxide, 2,2'-azobis(2-amidinopropane)hydrochloride, lauryl peroxide and AIBN (azobisisobutyronitrile). The polymerization initiator is used in an amount of usually 0.1 to 3 parts by weight, preferably 0.3 to 1 part by weight, based on 100 parts by weight of the monomer components.

The acrylic resin particles comprising the acrylic copolymer have a mean particle diameter of usually 0.05 to 100 $\mu$m, preferably 0.1 to 70 $\mu$m. Because of the $-N^+R^2{}_3.X^-$ group ($R^2$ and X have the same meaning as defined above), the acrylic resin particles exhibit good hydrophilic properties, and because of the crosslinked structure, these particles have excellent water resistance.

The acrylic resin particles having the above properties are particularly suitable as an ink absorbent to be introduced into an ink-receiving layer of an ink-jet recording medium.

The ink-jet recording medium of the invention comprises a substrate and an ink-receiving layer formed at least one surface of the substrate, and in many cases, both surfaces thereof.

Examples of the substrates for constituting the ink-jet recording medium of the invention include paper, non-woven fabrics, cloths, resin molded products, resin films (or sheets), metals and glasses.

According to the ink-jet recording system, not only paper but also materials on which formation of letters or images has been hitherto difficult, such as resin films, resin sheets, metals and glasses, can be employed as the substrate. Further, formation of letters or images can be made on not only a plane surface as in the paper or the resin film but also a curved surface. Moreover, the substrate is not limited to a thin material such as paper or a film, and it may be a surface to constitute a solid. In the invention, the substrate may be a surface of a solid, so that the thickness of the substrate is not specifically limited. When the substrate is paper or a non-woven fabric, the thickness thereof is in the range of usually 50 to 300 $\mu$m. In the ink-jet recording system, it is feasible to form images or letters on a surface of a transparent resin film or sheet, and the system is particularly suitable for producing a light transmission recording medium such as an OHP sheet. The light transmission recording medium is produced by the use of a transparent resin film or sheet, such as a polyester resin sheet (e.g., polyethylene terephthalate sheet), a poly(meth)acrylate sheet and a polypropylene sheet. The thickness of the resin film or sheet is in the range of usually 25 to 200 μm.

The ink-jet recording medium of the invention has the above-mentioned substrate and an ink-receiving layer provided on at least one surface of the substrate. The ink-receiving layer is generally made from organic fine particles and a binder. In the ink-jet recording medium of the invention, the aforesaid hydrophilic acrylic copolymer can be used as a binder, or the aforesaid hydrophilic acrylic resin particles can be used as the organic fine particles. Particularly in the ink-jet receiving layer of the ink-jet recording medium of the invention, the aforesaid hydrophilic acrylic resin particles are preferably compounded.

The hydrophilic acrylic resin particles used herein have a mean particle diameter of usually 0.05 to 100 μm, preferably 0.1 to 70 μm, and shows a water absorption, as measured by a dynamic wettability tester, of not less than 0.01 g/cm$^2$·min, per unit area and unit time. In case of lipophilic resin particles or weakly hydrophilic resin particles, water hardly permeates into the particles, and the water absorption is less than 0.01 g/cm$^2$·min. The water absorption values mentioned above are values obtained by measurement of water permeation into resin particles by means of WET-6000 available from Reska K.K.

Examples of the binders for constituting the ink-receiving layer include water-soluble resins, such as water-soluble cellulose, modified or unmodified polyvinyl alcohol, polyvinyl pyrrolidone, starch, starch derivative, polyacrylic acid, polyacrylic acid alkali metal salt, polyacrylamide, polyethylene oxide, polyethylene glycol polyvinylmethyl ether, casein, gelatin and polyvinyl caprolactam. The binder component may be a resin which is cured by energy rays such as electron rays or ultraviolet rays.

The hydrophilic acrylic resin particles and the binder are used in a weight ratio of usually 5:95 to 80:20, preferably 15:85 to 60:40. If the amount of the hydrophilic acrylic resin particles is larger than the upper limit of the above range, the amount of the binder relatively becomes small, and therefore adhesion of the ink-receiving layer to the substrate is lowered, whereby the ink-receiving layer sometimes peels off from the substrate. If the amount of the binder is too large, damage resistance of the ink-receiving layer is lowered, and blocking easily takes place in, for example, an OHP sheet.

The ink-receiving layer can be generally formed by dispersing the hydrophilic acrylic resin particles and the binder in an aqueous medium to prepare a coating dispersion, applying the coating dispersion onto the substrate and drying the solution.

Examples of the aqueous media used for preparing the coating dispersion include water, a mixed solvent of water and alcohol, and a mixed solvent of alcohol and methyl ethyl ketone. The total content of the hydrophilic acrylic resin particles and the binder in the coating dispersion is preferably in the range of 10 to 40% by weight from the viewpoints of coating efficiency and drying efficiency.

To the coating dispersion, various components generally allowed to be introduced into an ink-receiving layer can be added if necessary. Examples of such components include ink absorption adjusting agents, such as glycerol, polyethylene glycol and surface active agents; weathering resistance improvers for ink, such as ultraviolet light absorbers and pH adjusting agents.

The ink-jet recording medium of the invention can be prepared by applying the coating dispersion onto the substrate and removing the aqueous medium.

The coating dispersion is applied onto the substrate by conventional coating methods such as bar coating, roll coating and blade coating. The coating dispersion is applied in such an amount that the dry thickness of the resulting ink-receiving layer becomes usually 1 to 40 μm, preferably 5 to 30 μm. The coating dispersion is applied onto the substrate as described above and then dried to form an ink-receiving layer.

When the substrate is a thin material such as paper or a film, the ink-receiving layer is formed on at least one surface of the substrate, but if necessary, it may be formed on both surfaces.

Between the substrate and the ink-receiving layer, an adhesive layer, a primer layer or the like can be provided.

As the ink for the ink-jet recording medium of the invention, ordinary ink such as ink comprising an aqueous dye, a wetting agent, a dye solubilizing agent and an aqueous medium can be employed.

In the ink-jet recording medium of the invention, the resin particles constituting the ink-receiving layer have the —N$^+$R$^2_3$.X$^-$ group and have a crosslinked structure as described above. Therefore, the resin particles per se not only absorb the jetted ink to keep it stably but also exhibit good water resistance. Further, because of high transparency of the resin particles, even if the coating dispersion containing the particles is applied onto an OHP sheet, the transparency of the sheet is not deteriorated.

The hydrophilic acrylic resin particles of the invention can be used by compounding them into the ink-receiving layer of the ink-jet recording medium, as described above. However, the hydrophilic acrylic resin particles can be used as an antistatic agent because they have the —N$^+$R$^2_3$.X$^-$ group. Further, they can be used as abrasive particles because they have high hardness. Furthermore, they can be used as an anti-fogging agent or a water wetting agent because they have hydrophilic properties.

The hydrophilic acrylic copolymer and the hydrophilic acrylic resin particles according to the invention have a crosslinked structure and further have the —N$^+$R$^2_3$.X$^-$ group. Therefore, they exhibit not only excellent hydrophilic properties but also water resistance.

The ink-jet recording medium according to the invention contains the hydrophilic acrylic resin particles in its ink-receiving layer, and therefore it has excellent ink absorption and ink fixation. Besides, the ink-jet recording medium shows good blocking resistance, and no color fading takes place even if the printed matter is stored for a long period of time.

EXAMPLE

The present invention is further described with reference to the following examples, but it should be construed that the invention is in no way limited to these examples.

Example 1

1 Mol of a compound represented by the following formula [I-1] was caused to react with 2 mol of acrylic acid and 2 mol of trimethylamine hydrochloride to obtain a compound represented by the following formula [I].

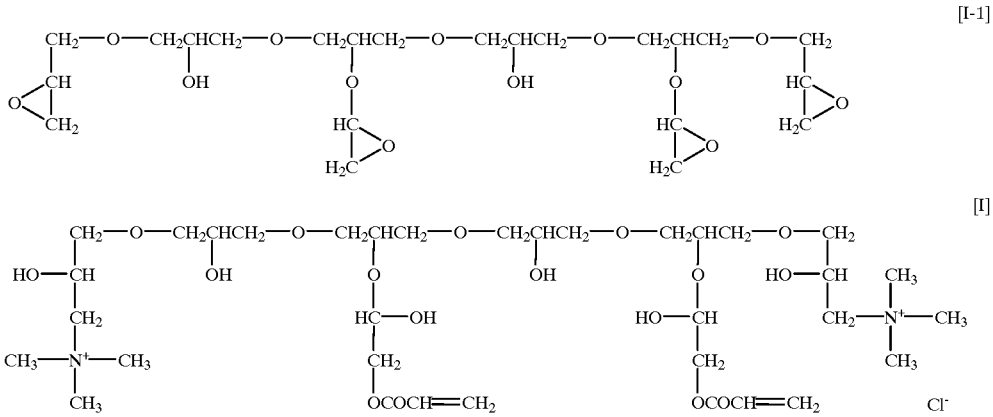

An infrared absorption spectrum of the compound represented by the formula [I] is shown in FIG. 1.

To a round bottom separable flask equipped with a condenser, a dropping funnel, a nitrogen gas feed pipe, a thermometer and a stirrer, 600 parts by weight of isopropyl alcohol, 300 parts by weight of water, 50 parts by weight of the compound represented by the formula [I], 50 parts by weight of acrylamide and 20 parts by weight of polyoxyethylene nonylphenyl ether (trade Name: Newcoal-562, HLB: 8.9, available form Nippon Emulsifying Agent K.K.) were introduced, and they were stirred.

After the air in the flask was replaced with a nitrogen gas, the temperature of the mixture was raised up to 72° C.

Separately, 1 part by weight of 2,2'-azobis(2-amidinopropane)hydrochloride as a polymerization initiator was dissolved in 100 parts by weight of water to prepare a solution. The solution was dropwise added to the mixture in the separable flask at a constant rate over a period of 2 hours through the dropping funnel.

After the dropwise addition was completed, the reaction liquid in the separable flask was heated up to 80° C. with stirring and maintained at this temperature for 3 hours.

After a lapse of 3 hours, the reaction temperature was lowered to room temperature.

Then, the reaction liquid was filtered through a wire cloth of 400 mesh to obtain a copolymer as a light white transparent viscous liquid.

Example 2

To a round bottom separable flask equipped with a condenser, a dropping funnel, a nitrogen gas feed pipe, a thermometer and a stirrer, 600 parts by weight of isopropyl alcohol, 300 parts by weight of water, 50 parts by weight of the compound represented by the aforesaid formula [III], 50 parts by weight of acrylamide and 20 parts by weight of polyoxyethylene nonylphenyl ether (trade Name: Newcoal-562, available from Nippon Emulsifying Agent K.K.) were introduced, and they were stirred.

After the air in the flask was replaced with a nitrogen gas, the temperature of the mixture was raised up to 72° C.

Separately, 1 part by weight of 2,2'-azobis(2-amidinopropane)hydrochloride as a polymerization initiator was dissolved in 100 parts by weight of water to prepare a solution. The solution was dropwise added to the mixture in the separable flask at a constant rate over a period of 2 hours through the dropping funnel.

After the dropwise addition was completed, the reaction liquid in the separable flask was heated up to 80° C. with stirring and maintained at this temperature for 3 hours.

After a lapse of 3 hours, the reaction temperature was lowered to room temperature.

Then, the reaction liquid was filtered through a wire cloth of 400 mesh to obtain a copolymer as a light white transparent viscous liquid.

Example 3

A copolymer of a light white transparent viscous liquid was obtained in the same manner as in Example 2, except that 20 parts by weight of polyoxyethylene alkyl ether phosphate (trade name: Plysurf A208S, acid value: 140–160, HLB: 7.0, available from Daiichi Kogyo Seiyaku K.K.) was used instead of 20 parts by weight of polyoxyethylene nonylphenyl ether.

Example 4

To a round bottom separable flask equipped with a condenser, a dropping funnel, a nitrogen gas feed pipe, a thermometer and a stirrer, 900 parts by weight of water and 100 parts by weight of the compound represented by the formula [I] were introduced, and they were stirred.

After the air in the flask was replaced with a nitrogen gas, the temperature of the mixture was raised up to 76° C.

Separately, 1 part by weight of potassium persulfate (KPS) as a polymerization initiator was dissolved in 100 parts by weight of water to prepare a solution.

The solution was dropwise added to the mixture in the separable flask at a constant rate over a period of 2 hours through the dropping funnel.

After the dropwise addition was completed, the reaction liquid in the separable flask was heated up to 80° C. with stirring and maintained at this temperature for 3 hours.

After a lapse of 3 hours, the reaction temperature was lowered to room temperature.

Then, the reaction liquid was filtered through a wire cloth of 400 mesh to obtain a homopolymer as a white transparent viscous liquid.

Figure 2:
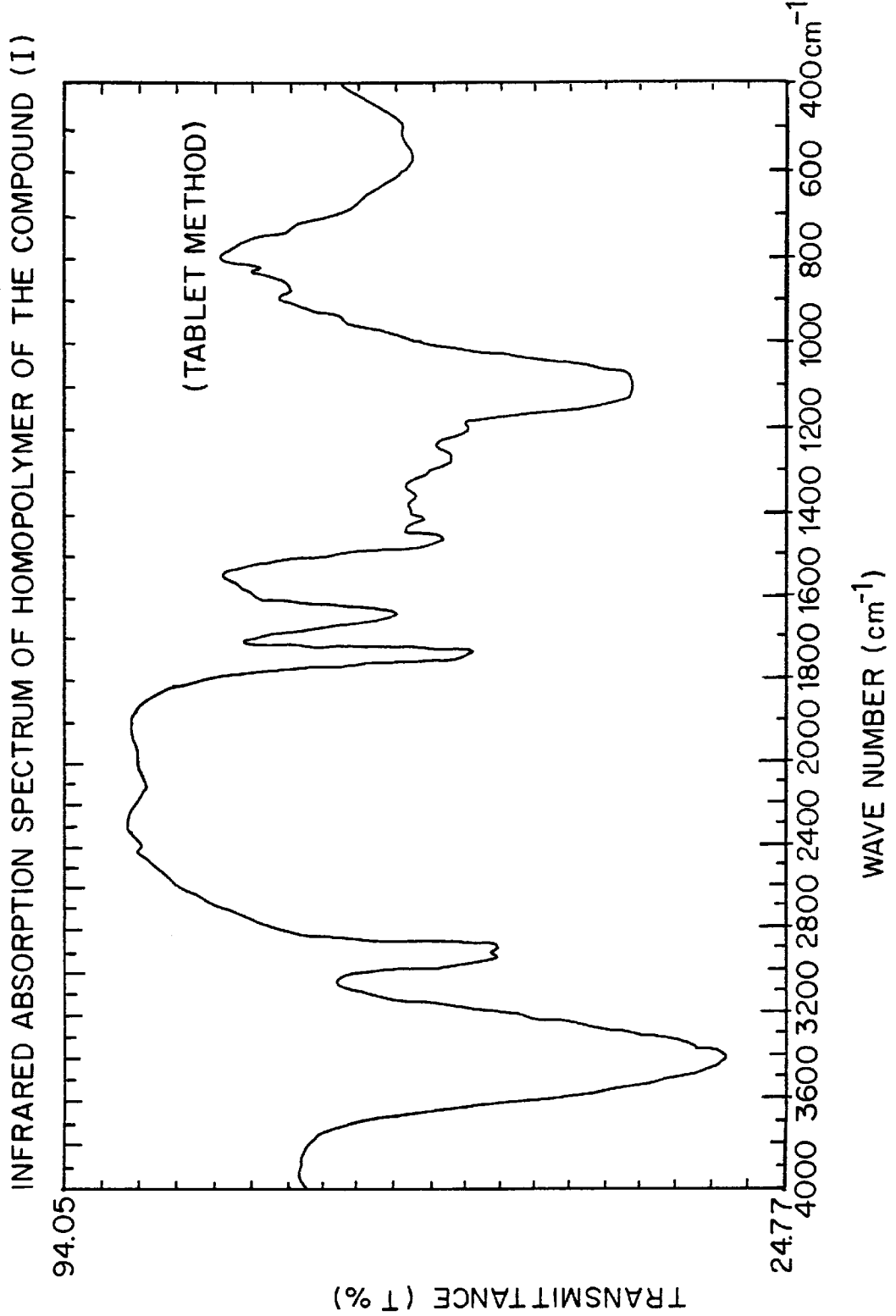
FIG. 2 is a chart of an infrared absorption spectrum of a homopolymer of a compound represented by the formula [I] obtained in Example 4, said spectrum being measured by a tablet method.

An infrared absorption spectrum of the homopolymer is shown in FIG. 2.

Figure 3:
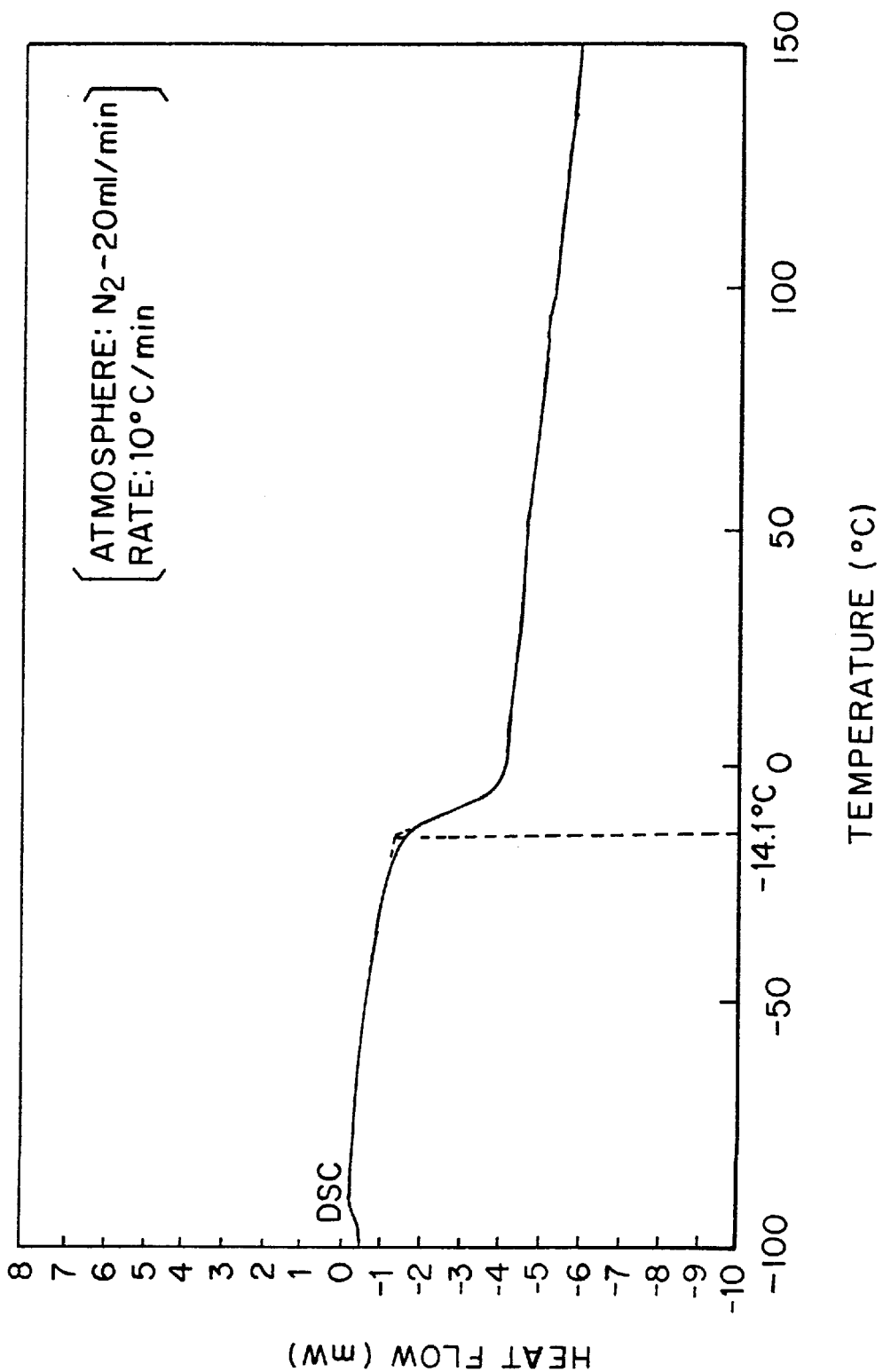
FIG. 3 is a DSC chart of a homopolymer of a compound represented by the formula [I] obtained in Example 4.

The results of DSC (differential scanning calorimeter) measurement of the homopolymer are shown in FIG. 3. As can be seen from FIG. 3, an endothermic peak appears at about −14.1° C.

Example 5

To a round bottom separable flask equipped with a condenser, a nitrogen gas feed pipe, a thermometer and a stirrer, 600 parts by weight of toluene and 1 part by eight of benzoyl peroxide were introduced, and they were stirred to dissolve benzoyl peroxide in toluene.

Separately, 50 parts by weight of the compound of the formula [I] prepared in Example 1, 40 parts by weight of acrylamide and 10 parts by weight of N-methylolacrylamide were added to 100 parts by weight of isopropyl alcohol and dissolved therein. The resulting solution and 20 parts by weight of polyoxyethylene nonylphenyl ether (trade Name: Newcoal-562, available from Nippon Emulsifying Agent K.K.) were added to the toluene solution in the separable flask. After the air in the flask was replaced with a nitrogen gas with stirring, the mixture was heated up to 76° C.

By the above reaction with stirring, the reaction liquid generated heat, and a polymer began to be produced. The reaction liquid was heated to 80° C. and maintained at this temperature for 3 hours.

After a lapse of 3 hours, the reaction liquid was cooled to room temperature, and the copolymer product was collected by filtration.

The copolymer product obtained was washed with 600 parts by weight of toluene and filtered. The resulting copolymer was dried at 70° C. for 2 hours.

After drying, the dried product was ground by a jet grinder to obtain a fine powder having a mean particle diameter of 0.3 to 0.4 $\mu$m.

An infrared absorption spectrum of the reaction product is shown in FIG. 4.

Example 6

To a round bottom separable flask equipped with a condenser, a nitrogen gas feed pipe, a thermometer and a stirrer, 600 parts by weight of toluene and 1 part by weight of benzoyl peroxide were introduced, and they were stirred to dissolve benzoyl peroxide in toluene.

Separately, 50 parts by weight of the compound represented by the aforesaid formula [III], 40 parts by weight of acrylamide and 10 parts by weight of N-methylolacrylamide were added to 100 parts by weight of isopropyl alcohol and dissolved therein. The resulting solution and 20 parts by weight of polyoxyethylene nonylphenyl ether (trade Name: Newcoal-562, available from Nippon Emulsifying Agent K.K.) were added to the toluene solution in the separable flask. After the air in the flask was replaced with a nitrogen gas with stirring, the mixture was heated up to 76° C.

Due to the above reaction with stirring, the reaction liquid generated heat, and a polymer began to be produced. The reaction liquid was heated up to 80° C. and maintained at this temperature for 3 hours.

After a lapse of 3 hours, the reaction liquid was cooled to room temperature, and the copolymer product was collected by filtration.

The copolymer product obtained was washed with 600 parts by weight of toluene and filtered. The resulting copolymer was dried at 70° C. for 2 hours.

After drying, the dried product was ground by a jet grinder to obtain a fine powder having a mean particle diameter of 0.3 to 0.4 $\mu$m.

Example 7

A fine powder having a mean particle diameter of 0.2 to 0.3 $\mu$m was obtained in the same manner as in Example 6, except that 20 parts by weight of polyoxyethylene alkyl ether phosphate (trade name: Plysurf A208S, acid value: 140–160, HLB: 7.0, available from Daiichi Kogyo Seiyaku K.K.) was used instead of 20 parts by weight of polyoxyethylene nonylphenyl ether.

Example 8

To 80 parts by weight of a mixed solvent of water and isopropyl alcohol (1:1, by volume), 10 parts by weight of acrylic copolymer particles (mean particle diameter: 0.3–0.4 $\mu$m) obtained in Example 5 and 10 parts by weight of polyvinyl alcohol as a binder were added, and they were vigorously stirred to obtain a coating dispersion.

The coating dispersion was applied onto a surface of wood free paper (thickness: 110 $\mu$m) using a bar coater in such an amount that the coated layer would have a thickness of 20 $\mu$m on dry basis, and the coated layer was dried to prepare an ink-jet recording medium.

On the ink-jet recording medium, printing was made using a commercially available ink-jet printer. Then, ink running and ink absorption were visually observed. As a result, no ink running was found on the recording medium. Besides, the ink absorption and the water resistance were both good. The printed recording medium was allowed to stand for 180 days, and ink color change with time was observed. As a result, no color change was observed.

Then, the above coating dispersion was applied onto both surfaces of a polyethylene terephthalate film (thickness: 100 $\mu$m) in such an amount that each coated layer would have a thickness of 20 $\mu$m on dry basis, to prepare a light transmission recording medium for OHP.

The light transmission recording media prepared as above were superposed upon each other and allowed to stand for 180 days. As a result, the light transmission recording media did not adhere to each other.

Example 9

To 80 parts by weight of a mixed solvent of water and isopropyl alcohol (1:1, by volume), 10 parts by weight of acrylic copolymer particles (mean particle diameter: 0.3–0.4 $\mu$m) obtained in Example 6 and 10 parts by weight of polyvinyl alcohol as a binder were added, and they were vigorously stirred to obtain a coating dispersion.

The coating dispersion was applied onto a surface of wood free paper (thickness: 110 $\mu$m) using a bar coater in such an amount that the coated layer would have a thickness of 20 $\mu$m on dry basis, and the coated layer was dried to prepare an ink-jet recording medium.

On the ink-jet recording medium, printing was made using a commercially available ink-jet printer. Then, ink running and ink absorption were visually observed. As a result, no ink running was found on the recording medium. Besides, the ink absorption and the water resistance were both good. The printed recording medium was allowed to stand for 180 days, and ink color change with time was observed. As a result, no color change was observed.

Then, the above coating dispersion was applied onto both surfaces of a polyethylene terephthalate film (thickness: 100 $\mu$m) in such an amount that each coated layer would have a thickness of 20 $\mu$m on dry basis, to prepare a light transmission recording medium for OHP.

The light transmission recording media prepared as above were superposed upon each other and allowed to stand for 180 days. As a result, the light transmission recording media did not adhere to each other.

Example 10

To 80 parts by weight of a mixed solvent of water and isopropyl alcohol (1:1, by volume), 10 parts by weight of acrylic copolymer particles (mean particle diameter: 0.2–0.3 µm) obtained in Example 7 and 10 parts by weight of polyvinyl alcohol as a binder were added, and they were vigorously stirred to obtain a coating dispersion.

The coating dispersion was applied onto a surface of wood free paper (thickness: 110 µm) using a bar coater in such an amount that the coated layer would have a thickness of 20 µm on dry basis, and the coated layer was dried to prepare an ink-jet recording medium.

On the ink-jet recording medium, printing was made using a commercially available ink-jet printer. Then, ink running and ink absorption were visually observed. As a result, no ink running was found on the recording medium. Besides, the ink absorption and the water resistance were both good. The printed recording medium was allowed to stand for 180 days, and ink color change with time was observed. As a result, no color change was observed.

Then, the above coating dispersion was applied onto both surfaces of a polyethylene terephthalate film (thickness: 100 µm) in such an amount that each coated layer would have a thickness of 20 µm on dry basis, to prepare a light transmission recording medium for OHP.

The light transmission recording media prepared as above were superposed upon each other and allowed to stand for 180 days. As a result, the light transmission recording media did not adhere to each other.

What is claimed is:

1. A hydrophilic acrylic copolymer having a crosslinked structure, and comprising:

(a) a recurring unit derived from a nitrogen-containing acrylic monomer having, in its molecule, at least two $CH_2=CR^1$—CO— groups, where $R^1$ is a hydrogen atom, a methyl group or an ethyl group, and at least one $—N^+R^2_3.X^-$ group, where each $R^2$ is independently a hydrogen atom, an alkyl group of 1 to 5 carbon atoms or an alkylol group of 1 to 5 carbon atoms, and X is a halogen atom, or a recurring unit derived from a nitrogen-containing acrylic monomer having, in its molecule, at least one $CH_2=CR^1$—CO— group, where $R^1$ is a hydrogen atom, a methyl group or an ethyl group, and at least two $—N^+R^2_3.X^-$ groups, where each $R^2$ is independently a hydrogen atom, an alkyl group of 1 to 5 carbon atoms or an alkylol group of 1 to 5 carbon atoms, and X is a halogen atom, and (b) a recurring unit derived from an acrylic monomer represented by the following formula (A):

$$CH_2=CR^3-CO-Q \qquad (A)$$

wherein $R^3$ is a hydrogen atom, a methyl group or an ethyl group, and Q is —$NH_2$, —NH—$R^4$—OH, where $R^4$ is an alkylene group of 1 to 5 carbon atoms, or —$R^5$, where $R^5$ is a hydrogen atom or an alkoxy group of up to 20 carbon atoms.

2. Hydrophilic acrylic resin particles comprising a hydrophilic acrylic copolymer having a crosslinked structure, and comprising:

(a) a recurring unit derived from a nitrogen-containing acrylic monomer having, in its molecule, at least two $CH_2=CR^1$—CO— groups, where $R^1$ is a hydrogen atom, a methyl group or an ethyl group, and at least one $—N^+R^2_3.X^-$ group, where each $R^2$ is independently a hydrogen atom, an alkyl group of 1 to 5 carbon atoms or an alkylol group of 1 to 5 carbon atoms, and X is a halogen atom or a recurring unit derived from a nitrogen-containing acrylic monomer having, in its molecule, at least one $CH_2=CR^1$—CO— group, where $R^1$ is a hydrogen atom, a methyl group or an ethyl group, and at least two $—N^+R^2_3.X^-$ groups, where each $R^2$ is independently a hydrogen atom, an alkyl group of 1 to 5 carbon atoms or an alkylol group of 1 to 5 carbon atoms, and X is a halogen atom, and (b) a recurring unit derived from an acrylic monomer represented by the following formula (A):

$$CH_2=CR^3-CO\cdot Q \qquad (A)$$

wherein $R^3$ is a hydrogen atom, a methyl group or an ethyl group, and Q is —$NH_2$, —NH—$R^4$—OH, where $R^4$ is an alkylene group of 1 to 5 carbon atoms, or —$R^5$, where $R^5$ is a hydrogen atom or an alkoxy group of up to 20 carbon atoms.

3. An ink-jet recording medium comprising a substrate and an ink-receiving layer formed on a surface of the substrate, wherein the ink-receiving layer contains hydrophilic acrylic resin particles comprising a hydrophilic acrylic copolymer having a crosslinked structure, and comprising:

(a) a recurring unit derived from a nitrogen-containing acrylic monomer having, in its molecule, at least two $CH_2=CR^1$—CO— groups, where $R^1$ is a hydrogen atom, a methyl group or an ethyl group, and at least one $—N^+R^2_3.X^-$ group, where each $R^2$ is independently a hydrogen atom, an alkyl group of 1 to 5 carbon atoms or an alkylol group of 1 to 5 carbon atoms, and X is a halogen atom, or a recurring unit derived from a nitrogen-containing acrylic monomer having, in its molecule, at least one $CH_2=CR^1$—CO— group, where $R^1$ is a hydrogen atom, a methyl group or an ethyl group, and at least two $—N^+R^2_3.X^-$ groups, where each $R^2$ is independently a hydrogen atom, an alkyl group of 1 to 5 carbon atoms or an alkylol group of 1 to 5 carbon atoms, and X is a halogen atom, and (b) a recurring unit derived from an acrylic monomer represented by the following formula (A):

$$CH_2=CR^3-CO\cdot Q \qquad (A)$$

wherein $R^3$ is a hydrogen atom, a methyl group or an ethyl group, and Q is —$NH_2$, —NH—$R^4$—OH, where $R^4$ is an alkylene group of 1 to 5 carbon atoms, or —$R^5$, where $R^5$ is a hydrogen atom or an alkoxy group of up to 20 carbon atoms.

* * * * *

UNITED STATES PATENT AND TRADEMARK OFFICE
CERTIFICATE OF CORRECTION

PATENT NO. : 6,063,488
DATED : May 16, 2000
INVENTOR(S) : Masahiro Sato et al.

It is certified that error appears in the above-identified patent and that said Letters Patent is hereby corrected as shown below:

Column 15,
Line 4, "eight" should read -- weight --.

Column 18,
Line 21, "$CH_2=CR^3$-CO'Q" should read -- $CH_2=CR^3$-CO-Q --.
Line 54, "$CH_2=CR^3$-CO'Q" should read -- $CH_2=CR^3$-CO-Q --.

Signed and Sealed this

Twenty-first Day of January, 2003

JAMES E. ROGAN
*Director of the United States Patent and Trademark Office*